(12) United States Patent
Kamihata et al.

(10) Patent No.: US 6,354,246 B1
(45) Date of Patent: Mar. 12, 2002

(54) CREATURE TRANSPORTING CONTAINER

(75) Inventors: Shigezo Kamihata; Yasuhiro Sawada, both of Himeji (JP)

(73) Assignee: Kamihata Fish Industries Ltd., Himeji (JP)

( * ) Notice: Subject to any disclaimer, the term of this patent is extended or adjusted under 35 U.S.C. 154(b) by 0 days.

(21) Appl. No.: 09/448,279

(22) Filed: Nov. 24, 1999

(30) Foreign Application Priority Data

Mar. 18, 1999 (JP) ............................................. 11-73219

(51) Int. Cl.[7] .................................................. A01K 1/03
(52) U.S. Cl. ...................................................... 119/496
(58) Field of Search ................................. 119/203, 419, 119/201, 224, 496, 498

(56) References Cited

U.S. PATENT DOCUMENTS

| | | | |
|---|---|---|---|
| 3,565,041 A | * | 2/1971 | Brooks ........................... 119/3 |
| 4,334,500 A | * | 6/1982 | Ziller ........................... 119/15 |
| 4,421,235 A | | 12/1983 | Moriya |
| 4,863,051 A | | 9/1989 | Eibner et al. |
| 5,050,535 A | * | 9/1991 | McKellar et al. ............... 119/3 |
| 5,190,879 A | | 3/1993 | Wolfe et al. |
| 5,817,509 A | | 10/1998 | Stevens et al. |

FOREIGN PATENT DOCUMENTS

| | | |
|---|---|---|
| EP | 0866122 A | 9/1998 |
| GB | 1530705 A | 11/1978 |
| JP | 62285743 | 12/1987 |
| JP | 63273428 | 11/1988 |
| JP | 10276611 | 10/1998 |
| WO | WO96/30497 A | 10/1996 |

OTHER PUBLICATIONS

Netherlands Patent Office Search Report including English translation of Search Report.

* cited by examiner

Primary Examiner—Jordan Lofdahl
(74) Attorney, Agent, or Firm—Smith Patent Office

(57) ABSTRACT

A creature transporting container which can cheaply and safely transport a single fighting fish or other creature. The creature transporting container includes a cup-like container. An upper opening portion of the container is covered with an air permeable waterproof sheet that is permeable to air and not permeable to water. The air permeable waterproof sheet is held on the container by means of a removable cap having a structure that permits the air permeable waterproof sheet to contact air.

12 Claims, 5 Drawing Sheets

CREATURE TRANSPORTING CONTAINER

BACKGROUND OF THE INVENTION

1. Field of the Invention

The present invention relates to a creature transporting container, and in particular, to a container that can transport an individual living thing such as a fighting fish safely and inexpensively.

2. Description of the Related Art

An aquarium fish tank is frequently provided in a house or in an office to display fish such as tropical fish or the like in order to obtain a pleasant living space or work environment. The aquarium fish generally are distributed through a distribution channel from an importer or trader via a retail store to consumers.

Conventionally, in transporting these aquarium fish, the following transportation method has been carried out. The predetermined number of aquarium fish are put together with the proper amount of water into a bag made of a synthetic resin such as a vinyl bag. The mouth of the bag is closed with air or oxygen blown therein, and the bag is put into a corrugated carton or the like for transporting.

On the other hand, recently, in accordance with a variety of interests, it is desirable to breed fighting fish, for example, a betta (known officially as betta splendens aka Siamese Fighting Fish), as an aquarium fish. However, when two or more fighting fish are put into the same aquarium fish tank, these fighting fish attack each other in accordance with their nature. As a result, conventional transporting methods can result in the death of most of the fighting fish during their transportation. Thus, these fighting fish must be put individually into a bag, which is then closed with air or oxygen blown therein, and the bags are put into a corrugated carton for transporting in accordance with the conventional method. Alternatively, the fighting fish must be put individually into a plastic container such as a polyethylene container and be sealed watertight with a cap for transporting them. These methods are very troublesome and result in high transportation costs. Further, when using a watertight container, the creature in the container may be suffocated unless the cap is opened immediately upon arrival at their destination.

SUMMARY OF THE INVENTION

It is an object of the present invention to provide a creature-transporting container that can safely and inexpensively transport individual fighting fish.

The inventors have studied the above mentioned problems and have incorporated a material which is permeable to air but impermeable to water (hereinafter referred to as an air permeable waterproof material). When the fighting fish is put into a cup-like container together with water, and the mouth of the cup-like container is covered with the air permeable waterproof sheet, the transporting container can readily subdivide and transport the fighting fish individually thereby preventing them from harming one another. In addition, the transporting container according to the present invention is applicable to breeding of fighting fish and is applicable to transportation and breeding of creatures such as other fishes, insects and frogs requiring water and air.

The present invention provides a creature transporting container which is suitable for transporting a creature requiring water and air, comprising:

a container having an upper opening portion, wherein the creature to be transported may be put in together with a proper amount of water required for its existence;

an air permeable waterproof sheet which covers the upper opening portion of the container; and a removable cap for holding the air permeable waterproof sheet on the container, and which permits air to contact the air permeable waterproof sheet.

It is one of the features of the present invention that the air permeable waterproof sheet is used to cover and close the opening portion of the container. Therefore, even if the container with the cap attached thereto is inverted, an overflow or outflow of water does not occur. Further, there is no need to carry out the task of blowing oxygen or air into the bag as with conventional methods so that efficiency is improved and costs are lowered.

The air permeable waterproof sheet is made of a material which is air permeable but is not water permeable. More specifically, it is preferable to use a melt blown, non-woven fabric which is water repellent and made of a synthetic resin fiber of 0.02 to 0.06 denier. A melt blown, non-woven fabric made of a synthetic resin fiber of less than 0.02 denier lacks the proper air permeability. On the other hand, a melt blown, non-woven fabric made of a synthetic resin fiber exceeding 0.06 denier does not have sufficient waterproofing performance.

There is the possibility that the creature transport container falls down or turns upside down resulting from any number of factors such as vehicle vibration during transportation. Accordingly, it is desirable that the air permeable waterproof sheet is durable to hydraulic pressure created when the creature transporting container is inverted. Thus, it is preferable that the melt blown, non-woven fabric has a weight of 5 g to 50 g per 1 $m^2$. If the weight of the fabric is 5 g or more per 1 $m^2$, it is durable to a hydraulic head pressure of 10 cm. However, if the weight exceeds 5 g per 1 $m^2$, there is the possibility that the sheet lacks the proper permeability.

The air permeable waterproof sheet preferably has a permeability of 10 $cc/cm^2$-sec or more to supply sufficient air required for the survival of the creature. The permeability value of 10 $cc/cm^2$-sec is measured by a Frazile type air permeability test (JIS L1096).

The melt blown, non-woven fabric may be made of a synthetic resin fiber, for example, a polypropylene fiber or other synthetic resin fibers.

When the diameter of a synthetic resin fiber becomes smaller or when the weight per 1 $m^2$ of the melt blown, non-woven fabric becomes smaller, the sheet strength is lowered. In this case, reinforcement is preferable, and can be achieved by laminating a reinforcing sheet on either the surface side or the underside of the melt blown, non-woven fabric. The reinforcing sheet may be made of any material so long as it does not hinder the function of the melt blown, non-woven fabric. For example, a spun-bounded, non-woven fabric, woven fabric, paper and the like may preferably be used as the reinforcing sheet. How ever, the sheet may be made of any other suitable material. When using the spun-bounded, non-woven fabric sheet, it can be made of a polyester fiber preferably 2 to 5 denier.

The cap may be fitted or screwed onto the container so long as the air permeable waterproof sheet is held on the upper opening portion of the container. It is important that the cap has a structure that permits air to contact the air permeable waterproof sheet. If the cap has an airtight structure, air can not be supplied into the container via the air permeable waterproof sheet. As a result, the creature in the container may die.

More specifically, the cap is formed with one or a plurality of through holes. Preferably, the through holes have a size such that a human finger can not fit therein because there is the possibility that the air permeable waterproof sheet will be punctured or torn by mistake.

Further, so long as the air permeable waterproof sheet is held on the upper opening portion of the container, the cap may be used independently from the air permeable waterproof sheet and may be attached onto the container after covering the sheet on the upper opening portion of the container. Alternatively, the cap previously held with the air permeable waterproof sheet may be attached onto the container while the air permeable waterproof sheet covers the upper opening portion of the container.

The cap of the present invention is preferably a removable type. Thus, the cap can be removed from the container to feed the creature in the container. As a result, it is possible to maintain the creature put in the container. Accordingly, in a retail store, there is no need to separately prepare an aquarium fish tank or like case, and the transporting container may be placed on a shelf as it is. Also, consumers may buy and bring the transporting container with a creature put therein back to their home, and may house the creature using the transporting container.

In-keeping an aquarium fish, it is preferable that all or part of the container is transparent or semi-transparent. The container may be made of a synthetic resin material or glass material. The creature transporting container according to the present invention may be applied to a fighting fish such as a betta, and is applicable to other fishes, insects, frogs or the like. Furthermore, since the air permeable waterproof sheet is permeable to air and not permeable to water, it is possible to keep moisture in the container. Accordingly the creature transporting container according to the present invention is applicable to transportation or housing aquatic vegetation implanted into an aquarium fish tank.

When a transporting bag is made of the air permeable waterproof sheet, it is possible to improve transportability and workability as when just the opening portion of the container has been covered with the air permeable waterproof sheet.

That is, the present invention further provides a creature transporting bag which is suitable for transporting a creature requiring water and air, wherein the bag comprises an air permeable waterproof sheet which is permeable to air and not permeable to water, wherein the creature to be transported is put into the bag together with a proper amount of water required for its existence and a mouth of the bag is closed.

The mouth of the bag may be closed by any suitable means. When the mouth of the bag is closed using heat seal, it is possible to further improve workability.

BRIEF DESCRIPTION OF THE DRAWINGS

The above objects and features of the present invention will be apparent to those skilled in the art from the following description of the preferred embodiments thereof when considered in conjunction with the appended drawings in which.

DETAILED DESCRIPTION OF THE PREFERRED EMBODIMENTS

Figure 1:
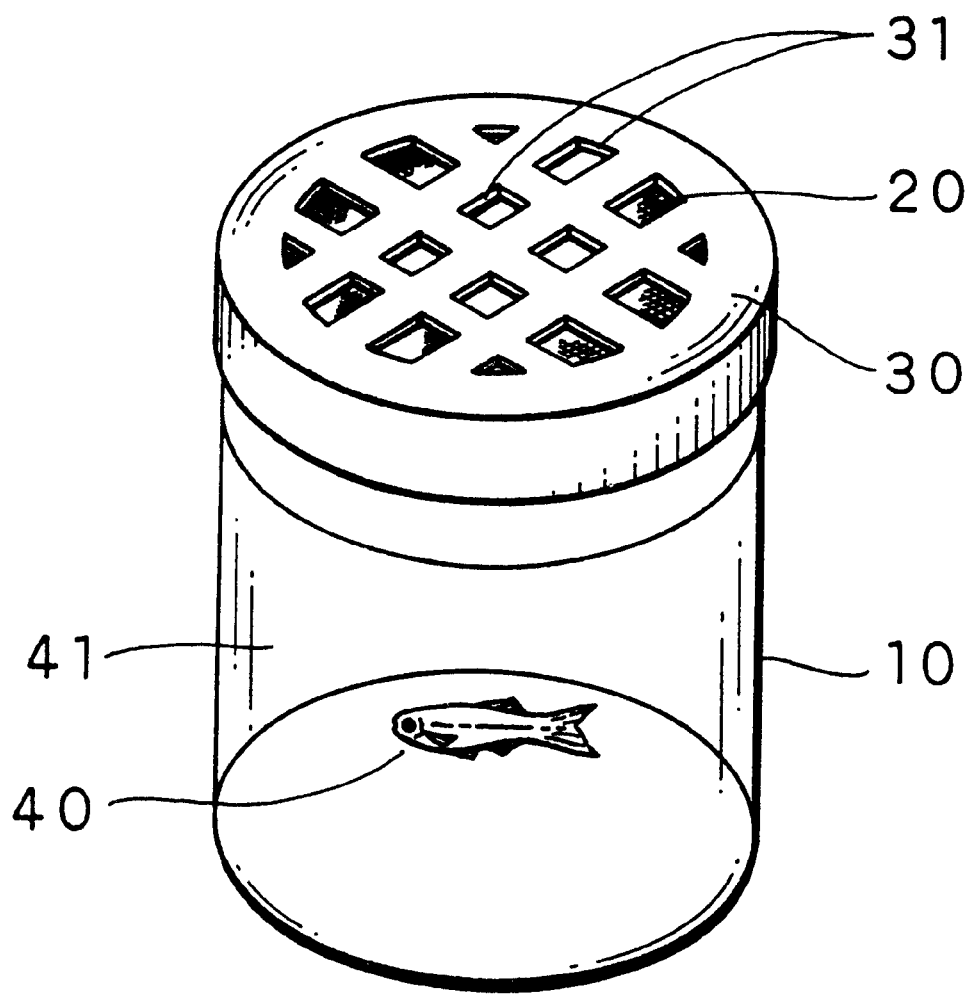
FIG. 1 is a schematic view showing a preferred embodiment of the creature transporting container according to the present invention.
Figure 2:
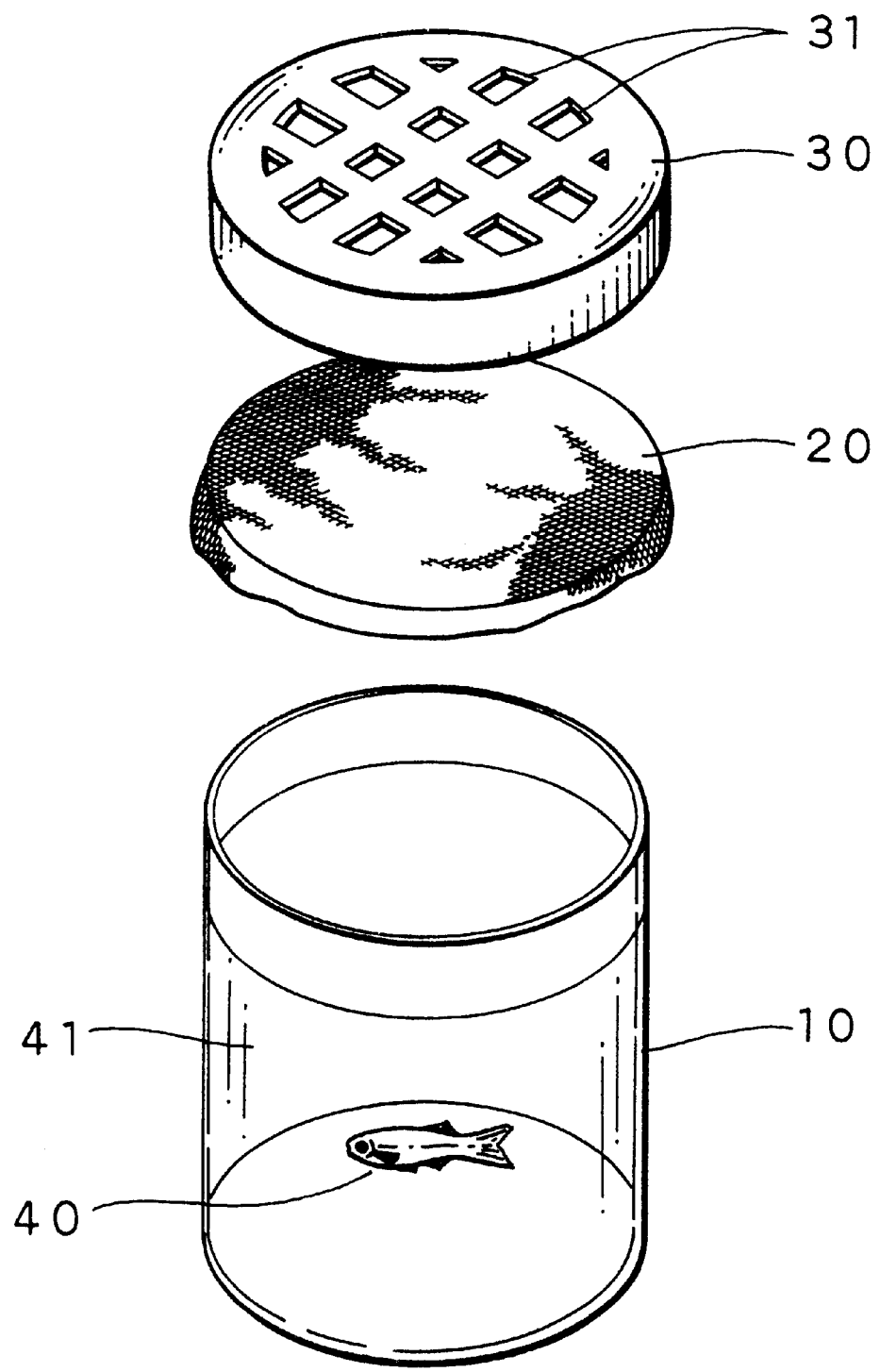
FIG. 2 is an exploded perspective view of the creature transporting container according to the present invention.

A preferred embodiment of the present invention will be described below in detail with reference to the accompanying drawings. FIG. 1 and FIG. 2 each show a preferred embodiment of the creature transporting container according to the present invention. A container 10 has a cylindrical shape with an open top and is made of a transparent glass material or transparent plastic material.

An aquarium fish 40 may be put in the container 10 together with the proper amount of water 41. An upper opening portion of the container 10 is covered with an air permeable waterproof sheet 20 that is permeable to air and not permeable to water. The air permeable waterproof sheet 20 is constructed by laminating a spun-bounded, non-woven fabric as a reinforcing sheet on the surface or the underside of a melt blown non-woven fabric that is water repellent. The melt blown non-woven fabric is made of a propylene fiber of 0.03 denier, and has a weight of 5 g or more per 1 $m^2$ and an air permeability of 10 $cc/cm^2$-sec (measured by the Frazile type air permeability test). Further, the spun-bounded non-woven reinforcing fabric is made of a polyethylene fiber of 2 to 5 denier.

The upper opening portion of the container 10 is covered by a removable cap 30 for holding the air permeable waterproof sheet 20. The cap 30 is manufactured in the shape of a cylindrical disk using a plastic material, and has a plurality of through holes 31 formed into a lattice at the upper wall surface. Each of these through holes 31 is formed in a size such that a human finger would not be able to penetrate the holes. In particular the holes may have a diameter of 0.5 cm or less.

In transporting an aquarium fish, for example, a fighting fish 40 from an importer to a retail store, a proper amount of water 41 is put in the container 10, and one fighting fish 40 is put therein. Thereafter, the upper opening portion of the container 10 is covered with the air permeable waterproof sheet 20, and then, is held in place by the cap 30. The air permeable waterproof sheet 20 is permeable to air and is not permeable to water. Thus, even if the container 10 is inverted due to any number of reasons, for example, vehicle vibration or the like, the water 41 in the container 10 will not leak therefrom. Thus, it is possible to safely transport the fighting fish 40.

Moreover, the cap 30 is formed with a plurality of through holes 31. Thus, as the air permeable waterproof sheet 20 contacts the atmosphere via these through holes 31 air is supplied into the container 10. Thus, the fighting fish does not die from lack of air in the water during transportation.

In addition, the retail store side needs to house the fighting fish 40 until purchased by consumers. In this case, the container 10 with the fighting fish 40 put therein may be placed on a shelf or the like without the need to transfer it to another container. In this manner, it is possible to easily maintain the fighting fish 40 until sale. In feeding the fighting fish 40, the cap 30 and the air permeable waterproof sheet 20 may be removed from the container 10.

When consumers buy the fighting fish, they may buy the fighting fish 40 along with the container 10 and can bring it back to their home as is. Further, it is possible for the consumer to continue to house the fighting fish 40 using the same container 10.

Figure 3:
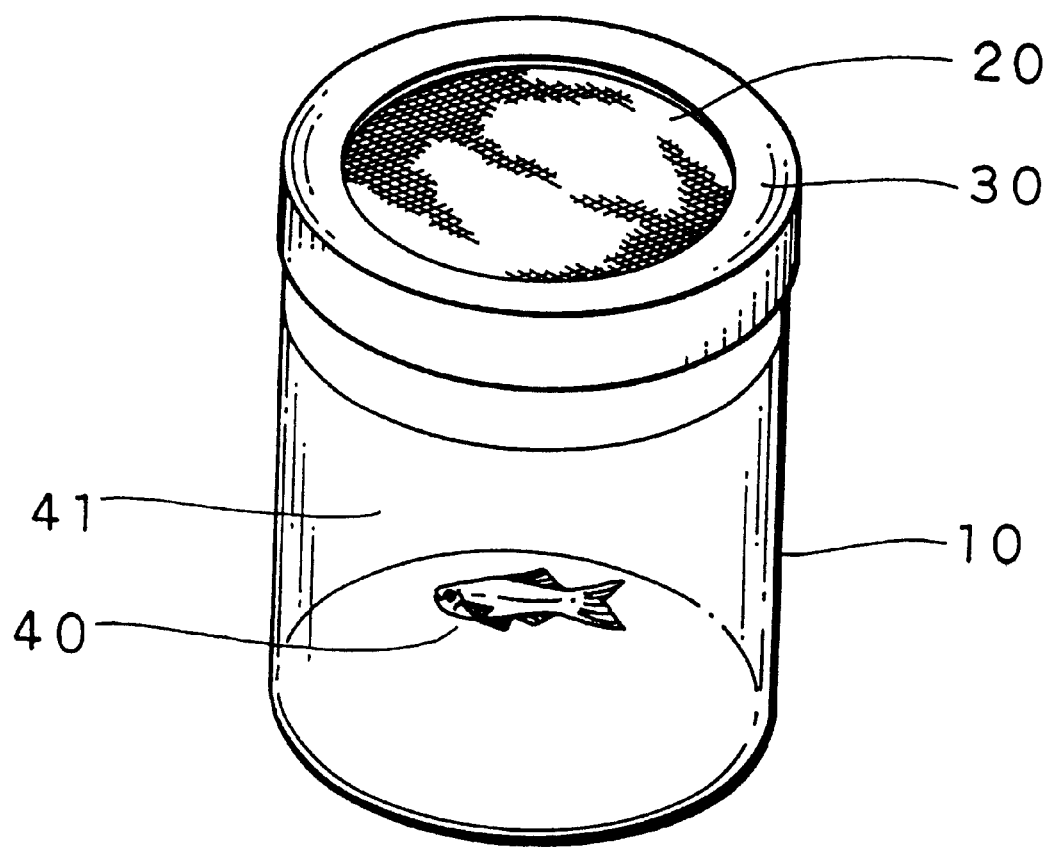
FIG. 3 is a perspective view schematically showing a second embodiment of the creature transporting container according to the present invention.
Figure 4:
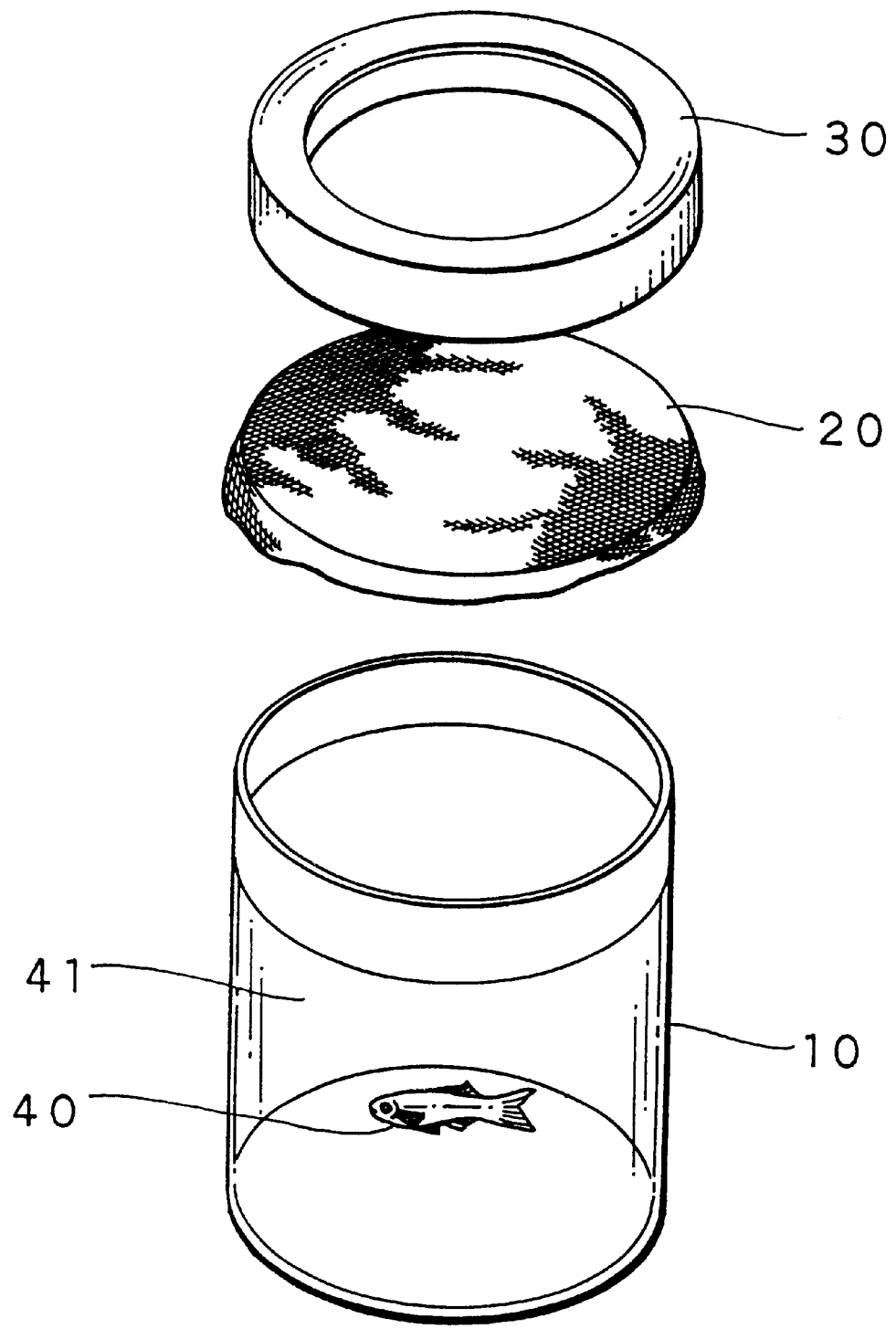
FIG. 4 is an exploded perspective view of the creature transporting container of the second embodiment.

FIG. 3 and FIG. 4 each show a second embodiment of the creature transporting container according to the present invention. In this second embodiment, a cap body 30 is manufactured with the use of plastic material so as to have a cross section in the shape of a letter L and to be formed into an annular shape when viewed from the plane. Further, the cap body 30 is constructed in a manner that the air permeable waterproof sheet 20 is attached onto the upper opening portion of the container body 10 in a state contacting the atmospheric air with a sufficient area. In FIG. 3 and FIG. 4, like reference numerals are used to designate the same or corresponding parts as that shown in FIG. 1 and FIG. 2.

In the case where there is not a problem if the air permeable waterproof sheet 20 is broken during transportation, it is preferable to employ a structure of contacting the air permeable waterproof sheet 20 with the atmospheric air using a sufficient area, like the second embodiment.

Figure 5:
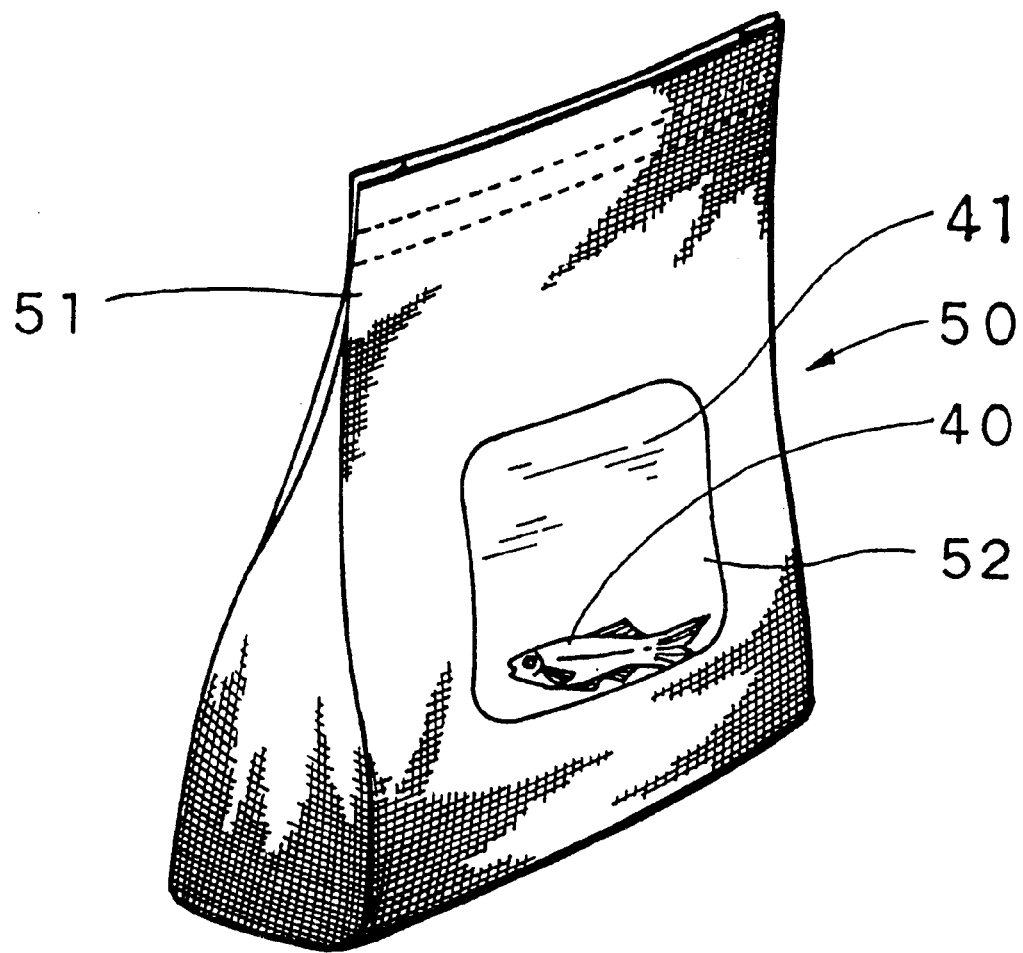
FIG. 5 is a perspective view schematically showing a third embodiment of the creature transporting container according to the present invention.

FIG. 5 shows a third embodiment of the creature transporting container according to the present invention. In this third embodiment, a bag body 50 as shown in FIG. 5 is used, and an aquarium fish 40 is put in the bag body 50 together with the proper amount of water 41. The mouth portion of the bag body 50 is sealed by means of a heat seal or the like.

This bag body 50 is manufactured with the use of an air permeable waterproof sheet 51. The bag 50 may be formed with an opening portion at a belly portion thereof. The opening portion is sealed by means of a transparent resin sheet 52 so that the aquarium fish 40 put therein can be seen.

The air permeable waterproof sheet 51 is constructed by laminating a spun-bonded non-woven fabric (reinforcing sheet) on a surface (or back surface) of a melt blown non-woven fabric having a water repellent performance. The melt blown non-woven fabric is made of a propylene fiber of 0.03 denier, and has a weight of 5 g or more per 1 m² and an air permeability of 10 cc/cm²-sec (measured by a Frazile type air permeability test) On the other hand, the spun-bonded non-woven fabric for reinforcement is made of a polyethylene fiber of 2 to 5 denier.

Further, a heat seal agent is applied to a back surface on the mouth portion of the air permeable waterproof sheet 51 so that the mouth portion is bonded by means of the heat seal. In addition, a synthetic resin heat agent having a heat seal performance may be applied thereto.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. A creature transporting container for transporting a creature requiring water and air, comprising:

a container having an upper open portion, wherein the creature to be transported may be put in together with a proper amount of water required for existence of the creature;

an air permeable waterproof sheet which is permeable to air and is not permeable to water, to cover said upper open portion of said container, the air permeable waterproof sheet comprising a melt blown non-woven fabric having an air permeability of at least 10 cc/cm²-sec; and a removable cap for holding said air permeable waterproof sheet on to said container, said cap being air permeable to permit said air permeable waterproof sheet to contact air, wherein said melt blown non-woven fabric comprises a water repellant synthetic resin fiber of 0.02 to 0.06 denier and a reinforcing sheet laminated on to one surface of said melt blown non-woven fabric.

2. A creature transporting container as claimed in claim 1, wherein said melt blown non-woven fabric has a weight of 5 g to 50 g per 1 m².

3. A creature transporting container as claimed in claim 1, wherein said melt blown non-woven fabric is made of a polypropylene fiber.

4. A creature transporting container as claimed in claim 1, wherein the cap is formed with at least one through hole.

5. A creature transporting container as claimed in claim 4, wherein the through holes have a diameter of 0.5 cm or less.

6. A creature transporting container as claimed in claim 1, wherein said container is sized for holding a creature such as a fighting fish.

7. A creature transporting bag as claimed in claim 1, wherein said air permeable waterproof sheet being durable to a hydraulic head pressure of 10 cm.

8. A creature transporting bag for transporting a creature requiring water and air, comprising:

a bag formed using an air permeable waterproof sheet which is permeable to air aid is not permeable to water, the air permeable waterproof sheet comprising a melt blown non-woven fabric having an air permeability of at least 10 cc/cm²-sec, wherein the creature to be transported may be placed in said bag together with a proper amount of water required for its existence, and said bag may be closed, and said melt blown ion-woven fabric is water repellent and comprises a synthetic resin fiber of 0.02 to 0.06 denier and a reinforcing sheet laminated on to one side of said melt blown non-woven fabric.

9. A creature transporting bag as claimed in claim 8, wherein said melt blown non-woven fabric has a weight of 5 g to 50 g per 1 m².

10. A creature transporting bag as claimed in claim 8, wherein said melt blown non-woven fabric is made of a polypropylene fiber.

11. A creature transporting bag as claimed in claim 8, wherein sail bag is sized and arranged so as to be capable of transporting a creature such as a fighting fish.

12. A creature transporting bag as claimed in claim 8, wherein said air permeable waterproof sheet being durable to a hydraulic head pressure of 10 cm.

* * * * *